US011454279B2

(12) United States Patent
Yamasuso et al.

(10) Patent No.: US 11,454,279 B2
(45) Date of Patent: Sep. 27, 2022

(54) THRUST MAGNETIC BEARING AND TURBO-COMPRESSOR WITH SAME

(71) Applicant: DAIKIN INDUSTRIES, LTD., Osaka (JP)

(72) Inventors: Shouhei Yamasuso, Osaka (JP); Yuji Nakazawa, Osaka (JP); Keiji Aota, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 98 days.

(21) Appl. No.: 17/033,078

(22) Filed: Sep. 25, 2020

(65) Prior Publication Data

US 2021/0010536 A1 Jan. 14, 2021

Related U.S. Application Data

(63) Continuation of application No. PCT/JP2019/008837, filed on Mar. 6, 2019.

(30) Foreign Application Priority Data

Mar. 28, 2018 (JP) .............................. JP2018-061177

(51) Int. Cl.
*F16C 32/04* (2006.01)
*F04D 29/058* (2006.01)
(Continued)

(52) U.S. Cl.
CPC ........ *F16C 32/0476* (2013.01); *F04D 29/058* (2013.01); *H02K 7/09* (2013.01); *H02K 7/14* (2013.01); *F05D 2240/515* (2013.01)

(58) Field of Classification Search
CPC ............. F16C 32/0476; F16C 32/0442; F16C 2360/44; F16C 2380/26; F16C 32/0489;
(Continued)

(56) References Cited

U.S. PATENT DOCUMENTS 3,909,082 A * 9/1975 Ishikawa ............. F16C 32/0476
310/90.5
3,937,533 A * 2/1976 Veillette .............. F16C 32/0457
310/90.5
(Continued)

FOREIGN PATENT DOCUMENTS

EP 0 344 596 A2 12/1989
JP 49-81746 A 8/1974
(Continued)

OTHER PUBLICATIONS

International Search Report of corresponding PCT Application No. PCT/JP2019/008837 dated May 7, 2019.
(Continued)

*Primary Examiner* — Ahmed Elnakib
(74) *Attorney, Agent, or Firm* — Global IP Counselors, LLP

(57) ABSTRACT

A thrust magnetic bearing includes a stator having a coil, and a rotor. The stator includes main and auxiliary stator magnetic-pole surfaces. The rotor includes main and auxiliary rotor magnetic-pole surfaces facing the main and auxiliary stator magnetic-pole surfaces. When an electric current flows in the coil, an electromagnetic force in an axial direction is generated between the main stator and rotor magnetic-pole surfaces, and an electromagnetic force in a radial direction is generated between the auxiliary stator and rotor magnetic-pole surfaces. When the rotor is displaced in the radial direction, a radial force that acts on the rotor between the auxiliary stator and rotor magnetic-pole surfaces is increased in a direction of the displacement, and a radial force that acts on the rotor between the main stator and rotor magnetic-pole surfaces is increased in a direction opposite to the direction of the displacement.

9 Claims, 6 Drawing Sheets

(51) Int. Cl.
*H02K 7/09* (2006.01)
*H02K 7/14* (2006.01)

(58) Field of Classification Search
CPC .............. F16C 32/0491; F16C 32/0497; F04D 29/058; F04D 17/10; H02K 7/09; H02K 7/14; H02K 2205/03; F05D 2240/515
USPC ....................................................... 310/90.5
See application file for complete search history.

(56) References Cited

U.S. PATENT DOCUMENTS

| | | | | |
|---|---|---|---|---|
| 5,385,007 A * | 1/1995 | Hartel | ................... | D01H 1/08 57/76 |
| 7,557,480 B2 * | 7/2009 | Filatov | ................ | F16C 32/0491 310/68 B |
| 8,482,174 B2 * | 7/2013 | Filatov | ................... | H02K 7/09 310/90.5 |
| 2004/0150278 A1 * | 8/2004 | Okada | ................... | F16C 32/048 310/90.5 |
| 2007/0164626 A1 * | 7/2007 | Taniguchi | ............... | F04D 29/05 310/90.5 |
| 2012/0212093 A1 * | 8/2012 | Sande | ...................... | H02K 1/14 156/60 |
| 2014/0234139 A1 * | 8/2014 | Sakawaki | ............. | F04D 19/048 310/90.5 |
| 2019/0203767 A1 | 7/2019 | Hirata et al. | | |

FOREIGN PATENT DOCUMENTS

| | | |
|---|---|---|
| JP | 2-26310 A | 1/1990 |
| JP | 2-140025 U | 11/1990 |
| JP | 7-317766 A | 12/1995 |
| JP | 2013-50180 A | 3/2013 |
| WO | 2018/033947 A1 | 2/2018 |

OTHER PUBLICATIONS

International Preliminary Report of corresponding PCT Application No. PCT/JP2019/008837 dated Oct. 8, 2020.

* cited by examiner

THRUST MAGNETIC BEARING AND TURBO-COMPRESSOR WITH SAME

CROSS-REFERENCE TO RELATED APPLICATIONS

This is a continuation of International Application No. PCT/JP2019/008837 filed on Mar. 6, 2019, which claims priority to Japanese Patent Application No. 2018-061177 filed on Mar. 28, 2018. The entire disclosures of these applications are incorporated by reference herein.

BACKGROUND

Field of Invention

The present disclosure relates to a thrust magnetic bearing and a turbo compressor including the same.

Background Information

Conventionally, there has been known a thrust magnetic bearing including a rotor that rotates together with a shaft and a stator that is disposed at a predetermined distance from the rotor, and supporting an axial load of the shaft in a non-contact manner (for example, Japanese Unexamined Patent Application Publication No. 7-317766). As shown in FIG. 8A of the same document, in order to reduce the diameter of the rotor, it has been proposed to provide the stator and the rotor with magnetic-pole surfaces facing each other in a radial direction.

SUMMARY

A first aspect of the present disclosure is directed to a thrust magnetic bearing (50) including a stator (59) having a coil (71), and a rotor (51). The stator (59) includes a main stator magnetic-pole surface (64) and an auxiliary stator magnetic-pole surface (70). The rotor (51) includes a main rotor magnetic-pole surface (52) facing the main stator magnetic-pole surface (64) and an auxiliary rotor magnetic-pole surface (58) facing the auxiliary stator magnetic-pole surface (70). When an electric current flows in the coil (71), an electromagnetic force in an axial direction is generated between the main stator magnetic-pole surface (64) and the main rotor magnetic-pole surface (52), and an electromagnetic force in a radial direction is generated between the auxiliary stator magnetic-pole surface (70) and the auxiliary rotor magnetic-pole surface (58). When the rotor (51) is displaced in the radial direction, a radial force that acts on the rotor (51) between the auxiliary stator magnetic-pole surface (70) and the auxiliary rotor magnetic-pole surface (58) is increased in a direction of the displacement, and a radial force that acts on the rotor (51) between the main stator magnetic-pole surface (64) and the main rotor magnetic-pole surface (52) is increased in a direction opposite to the direction of the displacement.

DETAILED DESCRIPTION OF EMBODIMENT(S)

First Embodiment

A first embodiment is described. In each figure, the right side (that is, an impeller-(30) side) is the "front side", and the left side is the "back side".

Structure of Turbo Compressor

Figure 1:
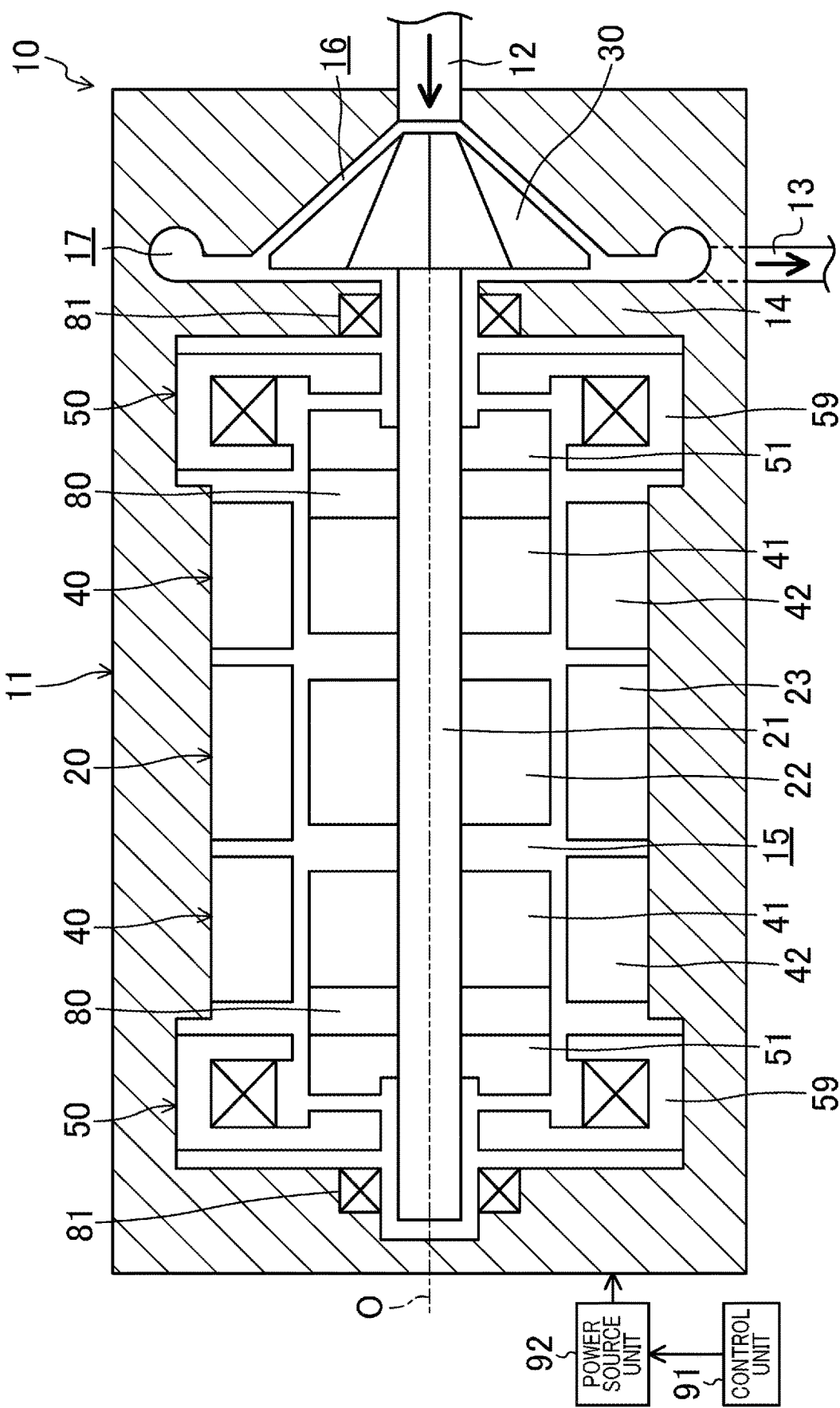
FIG. 1 illustrates an example of a structure of a turbo compressor of a first embodiment.

FIG. 1 illustrates an example of a structure of a turbo compressor (10) according to the first embodiment. The turbo compressor (10) includes an electric motor (20), an impeller (30), radial magnetic bearings (40), thrust magnetic bearings (50), a control unit (91), a power source unit (92), touchdown bearings (81), and a casing (11). The casing (11) has a circular cylindrical shape whose both ends are closed, and is disposed so that an axial line of the circular cylinder is oriented horizontally. A space in the casing (11) is partitioned by a wall portion (14). A space on a back side with respect to the wall portion (14) is a driving mechanism space (15) for accommodating the electric motor (20), the radial magnetic bearings (40), and the thrust magnetic bearings (50). A space on a front side with respect to the wall portion (14) is an impeller space (16) for accommodating the impeller (30).

Electric Motor

The electric motor (20) includes a shaft (21), a rotor (22), and a stator (23). The rotor (22) is fixed to the shaft (21) coaxially with the shaft (21). The rotor (22) is disposed so that an outer peripheral surface of the rotor (22) faces an inner peripheral surface of the stator (23) with a predetermined distance therebetween. The stator (23) is fixed to an inner peripheral surface of the casing (11). In this example, the electric motor (20) is a so-called permanent-magnet synchronous motor, and is accommodated in the driving mechanism space (15) so that a direction of an axis (O) of the shaft (21) is a horizontal direction.

Note that in the description below, "axial direction" is a direction of a rotation axis and refers to the direction of the axis (O) of the shaft (21), and "radial direction" is a direction orthogonal to the axial direction of the shaft (21). "Outer peripheral side" is a side farther from the axis (O) of the shaft (21), and "inner peripheral side" is a side closer to the axis (O) of the shaft (21).

Impeller

The impeller (30) is formed from a plurality of blades so that an outside diameter defines a substantially circular conical shape. With the impeller (30) being fixed to one end portion (a front end portion in this example) of the shaft (21), the impeller (30) is accommodated in the impeller space (16). An intake tube (12) and a discharge tube (13) are connected to the impeller space (16), and a compression space (17) is formed in an outer peripheral portion of the impeller space (16). The intake tube (12) is provided for guiding gas into the impeller space (16) from the outside, and the discharge tube (13) is provided for returning high-pressure gas that has been compressed in the impeller space (16) to the outside.

Radial Magnetic Bearings

Each of the radial magnetic bearings (40) is configured to support the shaft (21) by electromagnetic force in a non-contact manner. In this example, the radial magnetic bearings (40) are disposed so as to face each other with the electric motor (20) interposed therebetween in the axial direction. Each radial magnetic bearing (40) includes a rotor (41) fixed to the shaft (21) and a stator (42) disposed at a predetermined distance from the rotor (41). Each stator (42) is fixed to an inner peripheral wall of the casing (11).

Thrust Magnetic Bearings

The thrust magnetic bearings (50) are configured to control the position of the shaft (21) in the axial direction by electromagnetic force in a non-contact manner. In this example, one of the thrust magnetic bearings (50) is disposed between the impeller (30) and the front radial magnetic bearing (40) in the axial direction, and the other thrust magnetic bearing (50) is disposed behind the back radial magnetic bearing (40) in the axial direction. Each thrust magnetic bearing (50) includes a rotor (51) fixed to the shaft (21) and a stator (59) disposed at a predetermined distance from the rotor (51). Each stator (59) is fixed to the inner peripheral wall of the casing (11). The structure of each thrust magnetic bearing (50) is described in detail below.

Note that "center position" in the present specification is, in each thrust magnetic bearing (50), a position where a radial distance between the stator (59) and the rotor (51) (specifically, a radial distance between an inner peripheral surface of a second collar portion (69), described below, and the outer peripheral surface of the rotor (51)) is substantially constant over the entire periphery.

Control Unit

In order for the position of the shaft (21) to be a desired position, on the basis of a detection value of a gap sensor (not shown) that is capable of detecting a gap between the rotor (41) and the stator (42) of each radial magnetic bearing (40) and a detection value of a gap sensor (not shown) that is capable of detecting a gap between the rotor (51) and the stator (59) of each thrust magnetic bearing (50), the control unit (91) outputs an electric power command value (radial electric power command value) for controlling electric power that is supplied to each radial magnetic bearing (40) and an electric power command value (thrust electric power command value) for controlling electric power that is supplied to each thrust magnetic bearing (50). For example, the control unit (91) can be constituted by a microcomputer (not shown) and a program that causes the microcomputer to operate.

Power Source Unit

On the basis of the radial electric power command value and the thrust electric power command value that have been output from the control unit (91), the power source unit (92) supplies electric power to each radial magnetic bearing (40) and to each thrust magnetic bearing (50). For example, the power source unit (92) can be constituted by a PWM (Pulse Width Modulation) amplifier.

Touchdown Bearings

The touchdown bearings (81) are provided for preventing the stator (42) and the rotor (41) of each radial magnetic bearing (40) from coming into contact with each other and for preventing the stator (59) and the rotor (51) of each thrust magnetic bearing (50) from coming into contact with each other. In this example, although one touchdown bearing (81) each is provided at the wall portion (14) that separates the impeller space (16) and the driving mechanism space (15) from each other and at the back side with respect to the back thrust magnetic bearing (50), the number of touchdown bearings (81) and the arrangement of the touchdown bearings (81) are not limited thereto. Note that a radial distance between each touchdown bearing (81) and the shaft (21) is shorter than the radial distance between the stator (59) and the rotor (51) of each thrust magnetic bearing (50) (specifically, the radial distance between the inner peripheral surface of the second collar portion (69), described below, and the outer peripheral surface of the rotor (51)). For example, each touchdown bearing (81) can be constituted by an angular ball bearing.

Note that "movable range of the rotor (51) of each thrust magnetic bearing (50) in the radial direction" in the present specification refers to, when the touchdown bearings (81) exist, a range from the center position of the rotor (51) to a position at which the shaft (21) is in contact with each touchdown bearing (81); and, when the touchdown bearings (81) do not exist, a range from the center position of the rotor (51) to a position at which the rotor (51) is in contact with the stator (59).

Diameter of Each Rotor

As shown in FIG. 1, the diameter of the rotor (22) of the electric motor (20), the diameter of the rotor (41) of each radial magnetic bearing (40), and the diameter of the rotor (51) of each thrust magnetic bearing (50) are substantially equal to each other. A circular cylindrical non-magnetic ring (80) having a diameter that is substantially equal to that of each rotor (22, 41, 51) is disposed between the rotor (41) of each radial magnetic bearing (40) and the rotor (51) of each thrust magnetic bearing (50). In this way, by causing the diameter of each rotor (22, 41, 51) and the diameter of each nonmagnetic ring (80) to be substantially equal to each other, it is possible to handle each rotor (22, 41, 51) and the shaft (21) as one unit and to thus reduce the number of manhours to assemble the turbo compressor (10).

Structure of Thrust Magnetic Bearings

Figure 2:
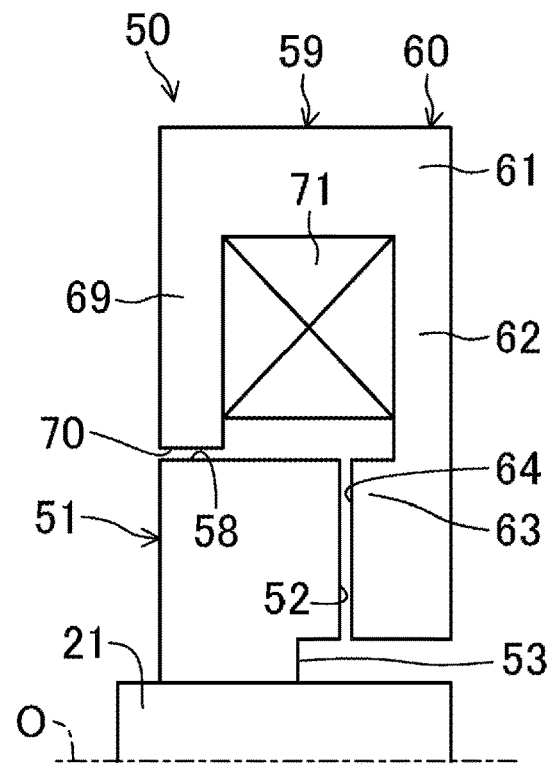
FIG. 2 is a partial sectional view of a thrust magnetic bearing of the first embodiment.

FIG. 2 is a partial sectional view of a thrust magnetic bearing (50) of the first embodiment. FIG. 2 shows half of the front thrust magnetic bearing (50), and the thrust magnetic bearing (50) is axially symmetrically configured with regard to the axis (O) of the shaft (21). This also applies to FIGS. 3 to 5 and FIGS. 7 and 8.

As shown in FIG. 2, as also described above, the thrust magnetic bearing (50) includes the stator (59) and the rotor (51).

The stator (59) includes an iron core portion (60) fixed to the inner peripheral wall of the casing (11) and a coil (71) disposed in the iron core portion (60). The iron core portion (60) includes an outer cylindrical portion (61), a first collar portion (62), and the second collar portion (69), which are integrated with each other. The iron core portion (60) may be constituted by, for example, electromagnetic steel plates that are stacked upon each other, or other magnetic materials, such as an iron dust core.

The outer cylindrical portion (61) has a circular cylindrical shape extending in the horizontal direction, and an outer peripheral surface of the outer cylindrical portion (61) is fixed to the inner peripheral wall of the casing (11).

In the front thrust magnetic bearing (50), the first collar portion 62 is formed so as to extend inward in the radial direction from a front inner peripheral portion of the outer cylindrical portion (61). A protruding end surface (that is, a radial inner surface) of the first collar portion (62) is spaced apart from an outer peripheral surface of the shaft (21) by only a predetermined distance. A ring-shaped protruding portion (63) protruding toward the rotor (51) in the axial direction (toward the left in FIG. 2) is formed at an inner portion of the first collar portion (62) in the radial direction. A protruding end surface (that is, a left surface in FIG. 2) of the ring-shaped protruding portion (63) is constituted by one planar surface that is orthogonal to the axial direction, and constitutes a main stator magnetic-pole surface (64).

In the front thrust magnetic bearing (50), the second collar portion (69) is formed so as to protrude inward in the radial direction from a back inner peripheral portion of the outer cylindrical portion (61). A protruding end surface (that is, a radial inner surface) of the second collar portion (69) is spaced apart from the outer peripheral surface of the rotor (51) by only a predetermined distance, and constitutes a circular cylindrical auxiliary stator magnetic-pole surface (70).

The coil (71) is disposed in the form of a ring in a space that is formed between the first collar portion (62) and the second collar portion (69). The coil (71) is connected to the power source unit (92) and is configured so that magnetic flux is generated in a magnetic path as a result of causing an electric current to flow, the magnetic path being defined by the stator (59) and the rotor (51).

The rotor (51) has a circular cylindrical shape extending in the horizontal direction, and the shaft (21) is inserted into and fixed to the rotor (51). The rotor (51) may be constituted by, for example, electromagnetic steel plates that are stacked upon each other, or other magnetic materials, such as an iron dust core. One axial end surface (that is, a stator-(59)-side surface) of the rotor (51) includes a ring-shaped concave portion (53) at an inner end portion in the radial direction, and a portion at an outer side in the radial direction with respect to the ring-shaped concave portion (53) constitutes a main rotor magnetic-pole surface (52). A portion of an outer peripheral surface of the rotor (51) facing the protruding end surface of the second collar portion (69) constitutes an auxiliary rotor magnetic-pole surface (58).

The main stator magnetic-pole surface (64) of the stator (59) and the main rotor magnetic-pole surface (52) of the rotor (51) face each other at a predetermined distance from each other in the axial direction. A radial length of the main stator magnetic-pole surface (64) and a radial length of the main rotor magnetic-pole surface (52) are substantially equal to each other. A radial inner end of the ring-shaped protruding portion (63) of the stator (59) (that is, a radial inner end of the main stator magnetic-pole surface (64)) and a radial inner end of the main rotor magnetic-pole surface (52) of the rotor (51) face each other in the axial direction. A radial outer end of the ring-shaped protruding portion (63) of the stator (59) (that is, a radial outer end of the main stator magnetic-pole surface (64)) and a radial outer end of the main rotor magnetic-pole surface (52) of the rotor (51) face each other in the axial direction.

Operation of Turbo Compressor

Next, an operation of the turbo compressor (10) is described. When electric power is supplied to the electric motor (20), the rotor (22) of the electric motor (20) rotates, and thus the shaft (21) and the impeller (30) rotate. Then, due to the rotation of the impeller (30), gas is sucked into the impeller space (16) from the intake tube (12) and is compressed. The compressed gas passes through the discharge tube (13) and is discharged from the impeller space (16).

Operation of Thrust Magnetic Bearings

An operation of each thrust magnetic bearing (50) is described below. When electric power is supplied to each coil (71) from the power source unit (92) on the basis of a thrust electric power command value, magnetic flux is generated in the magnetic path defined by each stator (59) and each rotor (51). Therefore, an electromagnetic force in the axial direction is generated between each main stator magnetic-pole surface (64) and each main rotor magnetic-pole surface (52) corresponding thereto, and the electromagnetic force in the axial direction supports a load in the axial direction to which a rotating system including the shaft (21) is subjected. On the other hand, an electromagnetic force in the radial direction is generated between each auxiliary stator magnetic-pole surface (70) and each auxiliary rotor magnetic-pole surface (58) corresponding thereto.

Here, when each rotor (51) is at substantially the center position (that is, the distance between the outer peripheral surface of each rotor (51) and the protruding end surface of the second collar portion (69) of each stator (59) is substantially constant over the entire periphery), electromagnetic forces in the radial direction that are generated between the auxiliary stator magnetic-pole surface (70) and the auxiliary rotor magnetic-pole surface (58) balance over the entire periphery. On the other hand, when each rotor (51) is displaced from the center position in the radial direction, electromagnetic forces in the radial direction that are generated between the auxiliary stator magnetic-pole surface (70) and the auxiliary rotor magnetic-pole surface (58) do not balance, and thus the electromagnetic forces act in a direction in which the displacement is increased. As the characteristic in which the electromagnetic force acts so as to increase the displacement in the radial direction becomes noticeable, the controllability of the position of each rotor (51) in the radial direction is reduced (that is, it becomes difficult to maintain each rotor (51) at the center position).

In contrast, when each rotor (51) is substantially at the center position, the main stator magnetic-pole surface (64) and the main rotor magnetic-pole surface (52) substantially face each other in the axial direction over the entire surface. On the other hand, when each rotor (51) is displaced in the radial direction from the center position, the main stator magnetic-pole surface (64) and the main rotor magnetic-pole surface (52) are displaced from each other in the radial direction. For example, when each rotor (51) is displaced upward from the state shown in FIG. 2, the main rotor magnetic-pole surface (52) is displaced upward with respect to the main stator magnetic-pole surface (64). In this case, a radial force that acts on each rotor (51) in a direction opposite to the displacement in the radial direction is generated between the main stator magnetic-pole surface (64) and the main rotor magnetic-pole surface (52). This is because the state in which the main stator magnetic-pole surface (64) and the main rotor magnetic-pole surface (52) face each other in the axial direction substantially over the entire surface is a state in which the resistance of the magnetic path between the main stator magnetic-pole surface (64) and the main rotor magnetic-pole surface (52) becomes a minimum, and when the displacement occurs from this position, the resistance of the magnetic path is increased and a reluctance force is generated. In this way, in each thrust magnetic bearing (50) of the present embodiment, when the rotor (51) is displaced in the radial direction, a facing area between the main stator magnetic-pole surface (64) and the main rotor magnetic-pole surface (52) is decreased and thus a radial force that acts on the rotor (51) between the main stator magnetic-pole surface (64) and the main rotor magnetic-pole surface (52) is increased in a direction opposite to the direction of the displacement.

Effects of First Embodiment

Each thrust magnetic bearing (50) of the present embodiment includes the stator (59) having the coil (71) and the rotor (51). The stator (59) includes the main stator magnetic-pole surface (64) and the auxiliary stator magnetic-pole surface (70). The rotor (51) includes the main rotor magnetic-pole surface (52) facing the main stator magnetic-pole surface (64) and the auxiliary rotor magnetic-pole surface (58) facing the auxiliary stator magnetic-pole surface (70). When an electric current flows in each coil (71), on the one hand, an electromagnetic force in an axial direction is generated between each main stator magnetic-pole surface (64) and each main rotor magnetic-pole surface (52) corresponding thereto, and, on the other hand, an electromagnetic force in a radial direction is generated between each auxiliary stator magnetic-pole surface (70) and each auxiliary rotor magnetic-pole surface (58) corresponding thereto. When each rotor (51) is displaced in the radial direction, on the one hand, a radial force that acts on each rotor (51) between the auxiliary stator magnetic-pole surface (70) and the auxiliary rotor magnetic-pole surface (58) is increased in a direction of the displacement, and, on the other hand, a radial force that acts on each rotor (51) between the main stator magnetic-pole surface (64) and the main rotor magnetic-pole surface (52) is increased in a direction opposite to the direction of the displacement.

In the present embodiment, the electromagnetic force in the axial direction that is generated between each main stator magnetic-pole surface (64) and each main rotor magnetic-pole surface (52) corresponding thereto when an electric current flows in each coil (71) causes each stator (59) to support each rotor (51) corresponding thereto in a non-contact manner. Since each thrust magnetic bearing (50) includes, in addition to the main stator magnetic-pole surface (64) and the main rotor magnetic-pole surface (52), the auxiliary stator magnetic-pole surface (70) and the auxiliary rotor magnetic-pole surface (58), it is possible to reduce the diameter of the rotor (51) to a relatively small diameter while ensuring a sufficient magnetic-pole area for generating an electromagnetic force in the axial direction for supporting the rotor (51) in a non-contact manner.

On the other hand, a radial force that acts on each rotor (51) between the auxiliary stator magnetic-pole surface (70) and the auxiliary rotor magnetic-pole surface (58) is increased in the same direction as the displacement in the radial direction of each rotor (51). This is similar to the thrust magnetic bearing according to Japanese Unexamined Patent Application Publication No. 7-317766, and is the cause of reducing the controllability of the position of the rotor (51) in the radial direction. In contrast, each thrust magnetic bearing (50) of the present embodiment is configured so that a radial force that acts on the rotor (51) between the main stator magnetic-pole surface (64) and the main rotor magnetic-pole surface (52) is increased in a direction opposite to the direction of displacement of the rotor (51) in the radial direction. This is to reduce the displacement of each rotor (51) in the radial direction, and this causes the controllability of the position of each rotor (51) in the radial direction to be enhanced. Therefore, according to the first embodiment, each thrust magnetic bearing (50) makes it possible to enhance the controllability of the position of the rotor (51) in the radial direction.

Each thrust magnetic bearing (50) of the present embodiment is configured so that the facing area between the main stator magnetic-pole surface (64) and the main rotor magnetic-pole surface (52) is decreased as the rotor (51) is displaced in an outward direction from the center position in the movable range in the radial direction. Therefore, when each rotor (51) is displaced in an outward direction from the center position, the facing area between the main stator magnetic-pole surface (64) and the main rotor magnetic-pole surface (52) is decreased and thus a radial force that acts on each rotor (51) between the main stator magnetic-pole surface (64) and the main rotor magnetic-pole surface (52) is increased in a direction opposite to the direction of displacement in the radial direction of each rotor (51).

In each thrust magnetic bearing (50) of the present embodiment, the rotor (51) has a circular cylindrical shape, one axial end surface of the circular cylindrical rotor (51) includes the ring-shaped concave portion (53) at the radial inner end portion, and the portion at the outer side in the radial direction with respect to the ring-shaped concave portion (53) constitutes the main rotor magnetic-pole surface (52); and the stator (59) includes the ring-shaped protruding portion (63) that protrudes toward the rotor (51) in the axial direction, whose radial inner end faces the radial inner end of the main rotor magnetic-pole surface (52) in the axial direction, whose radial outer end faces the radial outer end of the main rotor magnetic-pole surface (52) in the axial direction, and whose protruding end surface constitutes the main stator magnetic-pole surface (64).

Therefore, when each rotor (51) is at the center position, the main stator magnetic-pole surface (64) and the main rotor magnetic-pole surface (52) face each other with the radial outer ends thereof facing each other in the axial direction and the radial inner ends thereof facing each other in the axial direction. On the other hand, when each rotor (51) is displaced from the center position in the radial direction, the main stator magnetic-pole surface (64) and the main rotor magnetic-pole surface (52) are displaced from each other in the radial direction, and thus a radial force that acts on each rotor (51) between the main stator magnetic-pole surface (64) and the main rotor magnetic-pole surface (52) is increased in a direction opposite to the direction of the displacement (specifically, a reluctance force that acts on each rotor (51) in the opposite direction is generated).

In each thrust magnetic bearing (50) of the present embodiment, the main rotor magnetic-pole surface (52) is constituted by one planar surface that is orthogonal to the axial direction and the main stator magnetic-pole surface (64) is constituted by one planar surface that is orthogonal to the axial direction. Therefore, a radial force that acts so as to increase the displacement of each rotor (51) is not generated between the main rotor magnetic-pole surface (52) and the main stator magnetic-pole surface (64), and an electromagnetic force in the axial direction can be efficiently generated between the main rotor magnetic-pole surface (52) and the main stator magnetic-pole surface (64).

Modification 1 of First Embodiment

Modification 1 of the first embodiment is described with reference to FIG. 3. Each thrust magnetic bearing (50) of the present modification includes nonmagnetic bodies (54, 65) on the stator (59) and the rotor (51).

Figure 3:
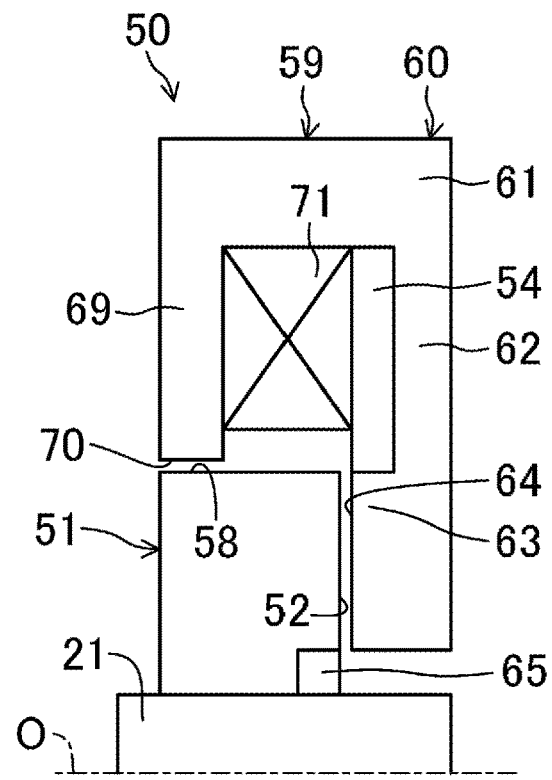
FIG. 3 is a partial sectional view of a thrust magnetic bearing of Modification 1 of the first embodiment.

As shown in FIG. 3, in the stator (59) of the thrust magnetic bearing (50), the nonmagnetic body (54) having a flat ring shape is provided between a radial outer surface (upper surface in FIG. 3) of the ring-shaped protruding portion (63) and an inner peripheral surface (lower surface in FIG. 3) of the outer cylindrical portion (61). The nonmagnetic body (54) may be made of, for example, resin.

In the rotor (51) of the thrust magnetic bearing (50), the nonmagnetic body (65) having a ring shape is provided in the ring-shaped concave portion (53). The nonmagnetic body (65) may be made of, for example, resin.

The other structures are the same as those of the first embodiment, and even the present modification provides effects that are the same as those of the first embodiment.

Modification 2 of First Embodiment

Modification 2 of the first embodiment is described with reference to FIG. 4. Each thrust magnetic bearing (50) of the present modification differs from those of the first embodiment in the shape of the main stator magnetic-pole surface (64) and the shape of the main rotor magnetic-pole surface (52).

Figure 4:
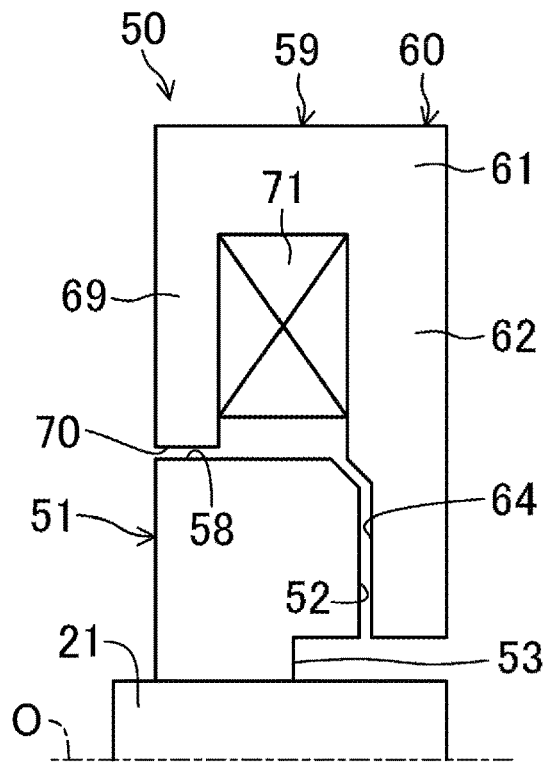
FIG. 4 is a partial sectional view of a thrust magnetic bearing of Modification 2 of the first embodiment.

As shown in FIG. 4, in the stator (59) of the thrust magnetic bearing (50), the main stator magnetic-pole surface (64) is inclined so that a radial outer end portion (that is, a radial outer end portion in a region facing the main rotor magnetic-pole surface (52)) extends toward the rotor (51) (towards the left in FIG. 4) with decreasing distance from a radial outer side.

In the rotor (51) of the thrust magnetic bearing (50), the main rotor magnetic-pole surface (52) is inclined so that a radial outer end portion extends towards a side opposite to the stator (59) (towards the left in FIG. 4) with decreasing distance from a radial outer side.

The main stator magnetic-pole surface (64) and the main rotor magnetic-pole surface (52) face each other in a direction that is tilted with respect to the axial direction in an inclination region, and face each other in the axial direction in a non-inclination region (that is, a region in which the main stator magnetic-pole surface (64) and the main rotor magnetic-pole surface (52) are orthogonal to the axial direction).

The other structures are the same as those of the first embodiment, and even the present modification provides effects that are the same as those of the first embodiment.

Modification 3 of First Embodiment

Modification 3 of the first embodiment is described with reference to FIG. 5. Each thrust magnetic bearing (50) of the present modification includes gaps (55, 66) in the stator (59) and the rotor (51).

Figure 5:
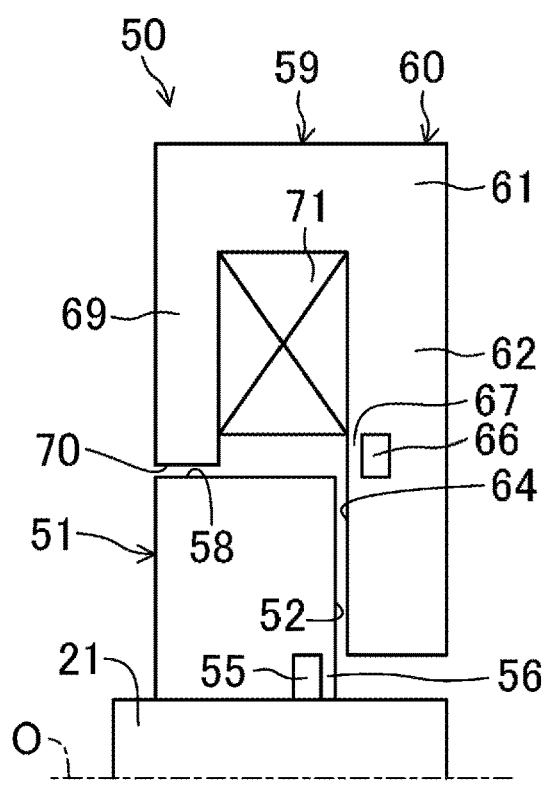
FIG. 5 is a partial sectional view of a thrust magnetic bearing of Modification 3 of the first embodiment.

As shown in FIG. 5, in the stator (59) of the thrust magnetic bearing (50), the stator gap (66) having a ring shape is formed near the main stator magnetic-pole surface (64) at a substantially central portion of the first collar portion (62) in the radial direction. In the radial direction, the position of a radial inner end of the stator gap (66) corresponds substantially to the position of the outer peripheral surface of the rotor (51). In the present modification, of a rotor-(51)-side surface of the first collar portion (62), a portion on a radial inner side with respect to the stator gap (66) constitutes the main stator magnetic-pole surface (64). When an electric current greater than or equal to a predetermined value is caused to flow in the coil (71), it is desirable that an axial distance between the stator gap (66) and the main stator magnetic-pole surface (64) be set so that magnetic saturation occurs at a magnetic portion (67) existing on a rotor-(51) side of the stator gap (66).

In the rotor (51) of the thrust magnetic bearing (50), the rotor gap (55) having a ring shape is formed near the main rotor magnetic-pole surface (52) at a radial inner end portion. In the radial direction, the position of a radial outer end of the rotor gap (55) corresponds substantially to the position of a radial inner end of the first collar portion (62). In the present modification, of one end surface (that is, of a stator-(59)-side surface) of the rotor (51), a portion on a radial outer side with respect to the rotor gap (55) constitutes the main rotor magnetic-pole surface (52). When an electric current greater than or equal to a predetermined value is caused to flow in the coil (71), it is desirable that an axial distance between the rotor gap (55) and the main rotor magnetic-pole surface (52) be set so that magnetic saturation occurs at a magnetic portion (56) existing on a stator-(59) side of the rotor gap (55).

The other structures are the same as those of the first embodiment, and even the present modification provides effects that are the same as those of the first embodiment.

Modification 4 of First Embodiment

Modification 4 of the first embodiment is described with reference to FIG. 6. In each thrust magnetic bearing (50) of the present modification, an axis (O') of the first collar portion (62) of the stator (59) is decentered from the axis (O) of the shaft (21) or the rotor (51).

Figure 6:
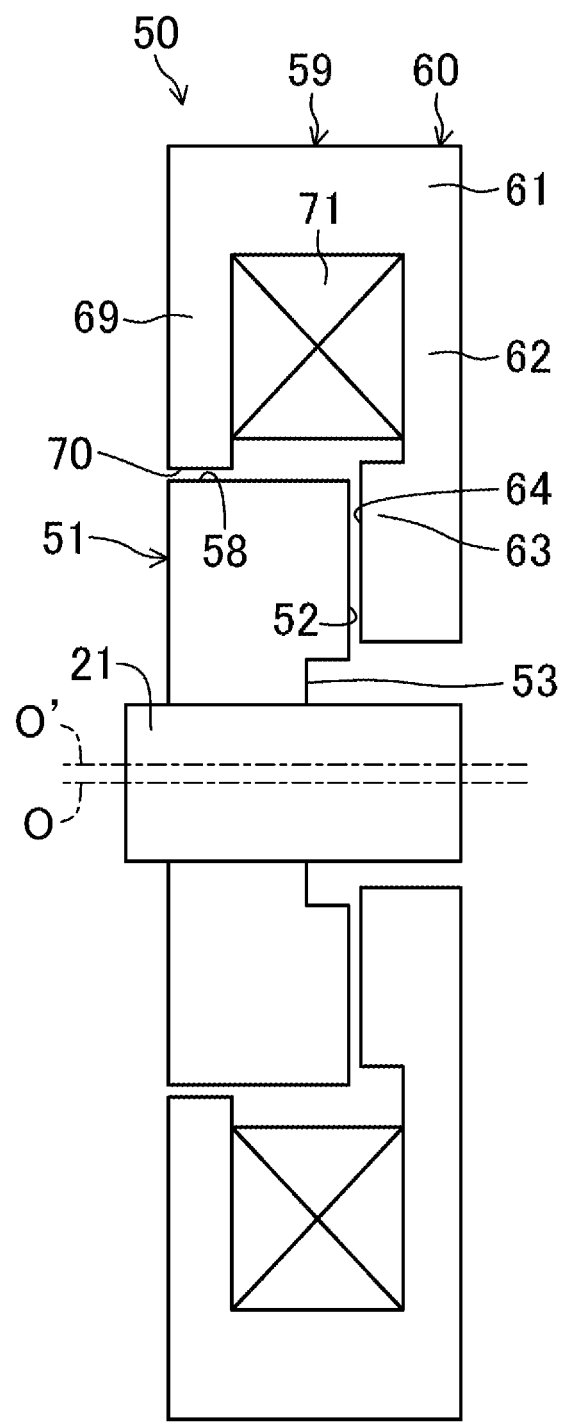
FIG. 6 is a sectional view of a thrust magnetic bearing of Modification 4 of the first embodiment.

As shown in FIG. 6, in the stator (59) of the thrust magnetic bearing (50), the axis (O') of the first collar portion (62) is decentered by only a predetermined distance in a predetermined direction (upward direction in this example) from the axis (O) of the shaft (21) or the rotor (51). Therefore, the distance between the protruding surface (that is, the radial inner surface) of the first collar portion (62) and the outer peripheral surface of the shaft (21) is, in FIG. 6, larger at a portion of the first collar portion (62) above the shaft (21) than at a portion of the first collar portion (62) below the shaft (21). On the other hand, an axis (O) of the second collar portion (69) (that is, an axis (O) of the stator (59)) coincides substantially with the axis (O) of the shaft (21) or the rotor (51).

Due to the structure above, in each thrust magnetic bearing (50) of the present modification, even if the rotor (51) is at the center position in the radial direction, a radial force (for example, a radial force including a reluctance force) in a decentering direction of the first collar portion (62) (upward direction in this example) acts on the rotor (51) between the main stator magnetic-pole surface (64) and the main rotor magnetic-pole surface (52). Therefore, it is possible to generate, for example, a force for supporting gravity that acts on the rotating system including the rotors (51) by causing an electric current to flow in the coils (71).

The other structures are the same as those of the first embodiment, and even the present modification provides effects that are the same as those of the first embodiment.

Second Embodiment

A second embodiment is described with reference to FIG. 7. Each thrust magnetic bearing (50) of the present embodiment includes concave portions (57, 58) at the main stator magnetic-pole surface (64) and the main rotor magnetic-pole surface (52), each concave portion (57, 68) being provided as a magnetic edge region (57, 68) at which magnetic resistance changes in the radial direction.

Figure 7:
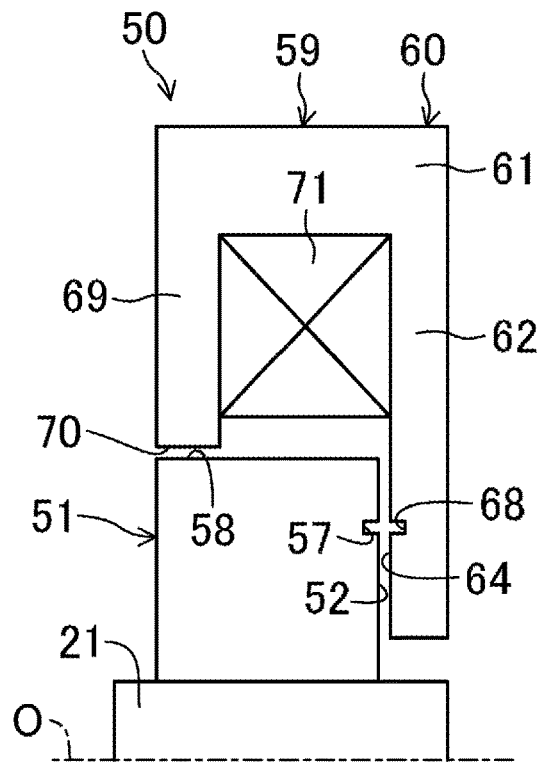
FIG. 7 is a partial sectional view of a thrust magnetic bearing of a second embodiment.

As shown in FIG. 7, in the thrust magnetic bearing (50) of the present embodiment, a portion of the first collar portion (62) of the stator (59) facing one end surface of the rotor (51) (front surface in this example) in the axial direction constitutes the main stator magnetic-pole surface (64), and a portion of the one end surface of the rotor (51) facing the main stator magnetic-pole surface (64) in the axial direction constitutes the main rotor magnetic-pole surface (52).

The main stator magnetic-pole surface (64) includes the ring-shaped stator concave portion (68) as the stator magnetic edge region (68). On the other hand, the main rotor magnetic-pole surface (52) includes the ring-shaped rotor concave portion (57) as the rotor magnetic edge region (57). The stator concave portion (68) and the rotor concave portion (57) are disposed at radial positions that substantially correspond with each other, and face each other in the axial direction. However, the stator concave portion (68) and the rotor concave portion (57) may be disposed at radial positions that do not corresponding with each other.

Due to the structure above, in each thrust magnetic bearing (50) of the present embodiment, when the rotor (51) is displaced outward from the center position in the radial direction, the positional relationship between the stator concave portion (68) and the rotor concave portion (57) changes, and thus a radial force (for example, a radial force including a reluctance force) that acts upon the rotor (51) in a direction opposite to the displacement is generated between the main stator magnetic-pole surface (64) and the main rotor magnetic-pole surface (52).

The other structures are the same as those of the first embodiment, and even the present embodiment provides effects that are the same as those of the first embodiment.

Other Embodiments

The embodiments above may feature the following structures below.

Figure 8:
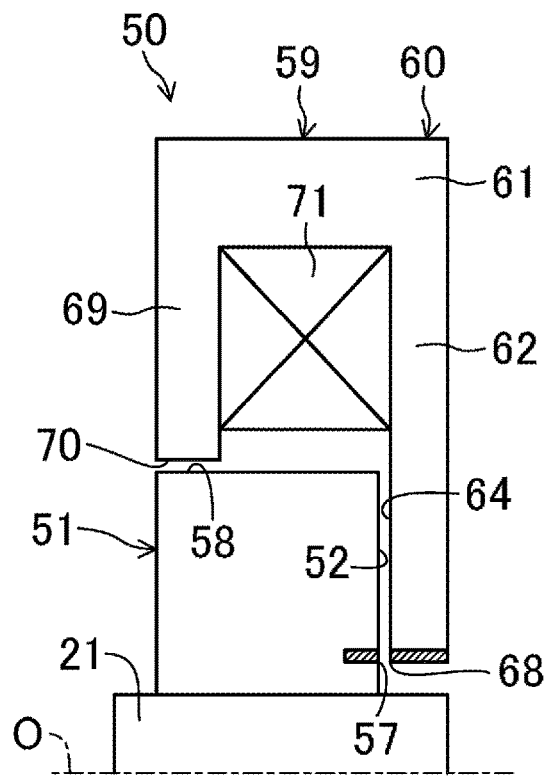
FIG. 8 is a partial sectional view of a thrust magnetic bearing of another embodiment.

For example, as shown in FIG. 8, a portion of the main stator magnetic-pole surface (64) and a portion of the main rotor magnetic-pole surface (52) may be made of a high-magnetic-permeability material that is a material having a magnetic permeability that is higher than that of a magnetic material of which the stator (59) or the rotor (51) is made. In this example, a radial inner end portion of the main stator magnetic-pole surface (64) and a portion of the main rotor magnetic-pole surface (52) facing the radial inner end portion in the axial direction is made of such a high-magnetic-permeability material (in FIG. 8, the portions that are made of such a high-magnetic-permeability material are darkly hatched). Due to the structure above, when the rotor (51) is displaced outward from the center position in the radial direction, the positional relationship between the portion of the stator (59) made of such a high-magnetic-permeability material and the portion of the rotor (51) made of such a high-magnetic-permeability material changes, and thus a radial force (for example, a radial force including a reluctance force) that acts on the rotor (51) in a direction opposite to the direction of the displacement is generated between the main stator magnetic-pole surface (64) and the main rotor magnetic-pole surface (52).

In each of the embodiments, as the rotor (51) of each thrust magnetic bearing (50) is displaced outward from the center position in the radial direction, a radial force that acts on the rotor (51) between the main stator magnetic-pole surface (64) and the main rotor magnetic-pole surface (52) is increased in a direction opposite to the direction of the displacement. Each thrust magnetic bearing (50) may be configured so that the radial force is increased in a direction opposite to the direction of the displacement only when the displacement amount of the rotor (51) in the radial direction is greater than a predetermined threshold value (that is, a value that is greater than zero and less than the length in the movable range. For example, each main stator magnetic-pole surface (64) and each main rotor magnetic-pole surface (52) may be designed so that, on the one hand, in a range in which the displacement amount of each rotor (51) is less than or equal to the threshold value, the facing area between each main stator magnetic-pole surface (64) and each main rotor magnetic-pole surface (52) corresponding thereto is substantially unchanged, and, on the other hand, when the displacement amount of each rotor (51) is greater than the threshold value, the facing area is decreased.

The shape of each main stator magnetic-pole surface (64) and the shape of each main rotor magnetic-pole surface (52) need not be a planar shape, and may be any other shape.

Figure 9:
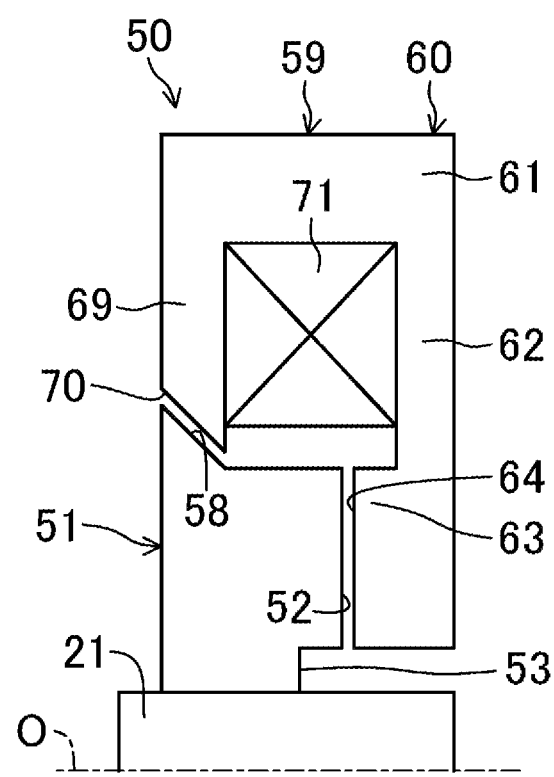
FIG. 9 is a partial sectional view of a thrust magnetic bearing of another embodiment.

For example, as shown in FIG. 9, the auxiliary-stator magnetic-pole surface (70) and the auxiliary-rotor magnetic-pole surface (58) need not face each other in the radial direction, and may face each other in a direction that is tilted with respect to the radial direction.

Note that each thrust magnetic bearing (50) is not limited in use to the turbo compressor (10).

Although the embodiments and modifications have been described above, it will be understood that various changes in form and detail can be made without departing from the spirit and scope of the claims. The embodiments and the modifications may be combined and replaced as appropriate as long as the object functions of the present disclosure are not impaired.

As described above, the present disclosure is useful for a thrust magnetic bearing and a turbo compressor including the same.

The invention claimed is:

1. A thrust magnetic bearing comprising:
   a stator having a coil; and
   a rotor,
   the stator including a main stator magnetic-pole surface, and an auxiliary stator magnetic-pole surface,
   the rotor including a main rotor magnetic-pole surface facing the min stator magnetic-pole surface, and an auxiliary rotor magnetic-pole surface facing the auxiliary stator magnetic-pole surface,
   when an electric current flows in the coil,
      an electromagnetic force in an axial direction is generated between the main stator magnetic-pole surface and the main rotor magnetic-pole surface, and
      an electromagnetic force in a radial direction is generated between the auxiliary stator magnetic-pole surface and the auxiliary rotor magnetic-pole surface, and
   when the rotor is displaced in the radial direction,
      a radial force that acts on the rotor between the auxiliary stator magnetic-pole surface and the auxiliary rotor magnetic-pole surface is increased in a direction of the displacement, and
      a radial force that acts on the rotor between the main stator magnetic-pole surface and the main rotor magnetic-pole surface is increased in a direction opposite to the direction of the displacement,
   the rotor having a circular cylindrical shape,
   one end surface of the circular cylindrical shaped rotor in the axial direction including a ring-shaped concave portion at a radial inner end portion and a portion at an outer side in the radial direction with respect to the ring-shaped concave portion forming the main rotor magnetic-pole surface, and
   the stator including a ring-shaped protruding portion, the ring-shaped protruding portion
      protruding toward the rotor in the axial direction,
      having a radial inner end that faces a radial inner end of the main rotor magnetic-pole surface in the axial direction,
      having a radial outer end that faces a radial outer end of the main rotor magnetic-pole surface in the axial direction, and
      having a protruding end surface that forms the main stator magnetic-pole surface.

2. The thrust magnetic bearing according to claim 1, wherein a facing area between the main stator magnetic-pole surface and the main rotor magnetic-pole surface changes when the rotor is displaced in the radial direction.

3. The thrust magnetic bearing according to claim 2, wherein
the facing area between the main stator magnetic-pole surface and the main rotor magnetic-pole surface is decreased as the rotor is displaced in an outward direction from a radial center side in at least a portion of a movable range in the radial direction.

4. The thrust magnetic bearing according to claim 1, wherein
the main stator magnetic-pole surface includes a stator magnetic edge region in which magnetic resistance changes in the radial direction, and
the main rotor magnetic-pole surface includes a rotor magnetic edge region in which magnetic resistance changes in the radial direction.

5. The thrust magnetic bearing according to claim 4, wherein
the stator magnetic edge region and the rotor magnetic edge region face each other in the axial direction.

6. The thrust magnetic bearing according to claim 4, wherein
the main rotor magnetic-pole surface is formed by one planar surface that is orthogonal to the axial direction, and
the main stator magnetic-pole surface is formed by one planar surface that is orthogonal to the axial direction.

7. The thrust magnetic bearing according to claim 1, wherein
the main rotor magnetic-pole surface is formed by one planar surface that is orthogonal to the axial direction, and
the main stator magnetic-pole surface is formed by one planar surface that is orthogonal to the axial direction.

8. The thrust magnetic bearing according to claim 1, wherein
the main stator magnetic-pole surface includes a stator concave portion, and
a rotor concave portion is formed at a position on the main rotor magnetic-pole surface facing the stator concave portion in the axial direction.

9. A turbo compressor including the thrust magnetic bearing according to claim 1, the turbo compressor further comprising:
a shaft with an impeller mounted thereon to be rotationally driven, the thrust magnetic bearing supporting the shaft in a noncontact manner.

* * * * *